United States Patent [19]

Gerber

[11] 4,108,733

[45] Aug. 22, 1978

[54] HIGH EFFICIENCY COKE OVEN REGENERATOR CHECKER BRICK

[75] Inventor: Donald Joel Gerber, Glenshaw, Pa.

[73] Assignee: Koppers Company, Inc., Pittsburgh, Pa.

[21] Appl. No.: 790,667

[22] Filed: Apr. 25, 1977

[51] Int. Cl.$^2$ ............... C10B 29/02; F23L 15/02
[52] U.S. Cl. ............... 202/267 A; 165/9.1; 202/222
[58] Field of Search ............ 202/222, 223, 267 A, 202/267 R; 165/9.1, 9.2, 9.3, 9.4

[56] References Cited

U.S. PATENT DOCUMENTS

| 1,703,793 | 2/1929 | Stein | 165/9.4 |
| 2,017,763 | 10/1935 | Mamula et al. | 165/9.4 |
| 2,018,223 | 10/1935 | Otto | 165/9.1 |
| 2,018,224 | 10/1935 | Otto | 165/9.4 |
| 2,389,166 | 11/1945 | Seaver | 165/9.1 |
| 2,428,461 | 10/1947 | Kinney et al. | 165/9.1 X |
| 2,598,262 | 5/1952 | Janson | 165/9.2 |

FOREIGN PATENT DOCUMENTS

| 121,536 | 1918 | United Kingdom | 165/9.2 |
| 667,448 | 2/1952 | United Kingdom | 165/9.1 |

Primary Examiner—Morris O. Wolk
Assistant Examiner—Roger F. Phillips
Attorney, Agent, or Firm—R. Lawrence Sahr; Oscar B. Brumback

[57] ABSTRACT

A coke oven regenerator checker brick which incorporates, with the principle of maximization of heat transfer, the ability to minimize pressure differential within such a regenerator, while providing facility of inexpensive manufacturing techniques. A coke oven checker of standard overall dimension incorporates wave-like corrugations, for maximum surface area exposure, and sufficient web thickness to enable manufacture by the conventional re-press method which is the most economical commercially available method for manufacturing refractory coke oven checker brick.

8 Claims, 3 Drawing Figures

HIGH EFFICIENCY COKE OVEN REGENERATOR CHECKER BRICK

BACKGROUND OF THE INVENTION

1. Field of the Invention

The present invention relates to coke oven regenerators, that area of a battery of coke ovens in which the waste gases produced by combustion are used to preheat the fuel gas mixture and/or air before it is fed into the combustion chambers, and the construction of those regenerators.

2. Description of the Prior Art

In the known coke oven regenerators, bricks, manufactured from a refractory material, are used to alternately absorb and radiate heat. The hot waste gases in the combustion chambers of a coke oven are channelled into the regenerator and over, through, and around the checker brick contained therein. These hot waste gases heat up the checker bricks. At a given point in time the flow of hot gases is rechannelled into the companion regenerator, which has been on the cooling portion of its cycle. In coke oven batteries heated with a fuel gas mixture of low calorific value, the fuel gas mixture, which is burned in the coke oven to provide heat for the coking process, is made up of air and low Btu lean gas. At a given time, the low Btu lean gas is channelled through one quarter of the overall regenerator or one half of the waste gas preheated regenerator. Air is channelled through the balance of the preheated regenerator. Hot waste gases, at this point, are conducted through the other half of the overall regenerator which has been previously cooled by earlier passage of low Btu gas and air. The low Btu lean gas and air are channelled across the preheated bricks, thus preheating these components of the fuel gas mixture, resulting in a higher combustion temperature per given volume of that fuel gas mixture. In coke oven batteries heated with a fuel gas mixture of higher calorific value, using a rich gas of high Btu content, the combustion air used to burn the fuel is not channelled across the preheated checker bricks, but that air is preheated to a lesser degree outside of the regenerator. The higher temperature per given volume of fuel gas mixture allows less fuel to be used to maintain a temperature within the coke oven sufficient to produce coking of coal, thus enhancing economy of operation. The efficiency of a coke oven regenerator depends on the ability of the checker brick to transfer heat while at the same time minimizing the degree of restriction of flow of the various gases, including waste gas, air or fuel gas, which move through the regenerator.

The object of developing efficiency in coke oven regenerator checker brick is threefold. Firstly, with a more efficient brick, fewer brick can be used to achieve an equivalent result. This allows a reduction in size, in particular the height, of coke ovens, resulting in less of an initial capital investment in construction. Secondly, a reduction in the quantity of fuel gas used can be achieved, releasing a valuable energy producer for other uses. Thirdly, higher heat can be achieved in the coke oven by increasing the efficiency of the checker brick. The result is a faster coking cycle which, in turn, can increase daily production of coke.

Many intricate designs of refractory regenerator brick have been developed to increase the surface area of the bricks thus enhancing the transfer of a greater quantity of heat per given unit of time. Specifically, this is achieved by inserting slots into the bricks, then corrugating the surfaces of those slots, and finally developing cross-channels in the bricks, all of which serve to increase the area of the brick which is exposed to the gases. However, none of these has been developed to the point of commercial success for use in coke oven regenerators.

One limitation on this line of development is found in the fact that for the checker brick to do its job, it must retain a certain minimum mass of refractory material. This is necessary to retain sufficient heat from the waste gases to preheat the fuel gas and/or air after the gases are rechannelled. Another limitation is found in the fact that any reduction in the total open cross-sectional area of the apertures of the checker brick, with respect to the total cross-sectional area of the regenerator, restricts the flow of gases through the regenerator and increases the pressure losses of the system. A third limitation is found in the minimal size of corrugation spacing that is operable over an extended period of time. Coke oven waste gases, and blast furnace gas when used, contain particulate matter which will clog up the corrugations over a period of time if those corrugations are too small and/or placed too closely together.

Finally, a fourth limitation is found in the cost of the brick itself. The more intricate the design of the apertures and the thinner the cross section of the walls, the more expensive it is to manufacture the checker brick. Two basic methods are available to manufacture refractory checker brick. The first is by casting, where the refractory material is poured into a mold in which it must be left for an extended period of time to set up. The green brick is then ejected from the mold and placed in heated means for drying to drive out the moisture. The dried brick is then placed in a high temperature kiln where it is cured by firing. This cures the brick into a finished product. The second process, much more economical where it can be used, consists of a die through which viscous refractory material is pushed by a press to form a slug. The slug is then re-pressed into a mold and ejected in the form desired. This refractory form is then dried and placed directly into a kiln to be cured. This second process is called the re-press method. However, this re-press process suffers from a deficiency. Refractory forms, with minimal and intricate cross-sectional areas and designs, such as those illustrated in British Patent No. 121,536 and in German Auslegeschrist No. 2,425,931, readily crack and crumble during the curing phase, as the temperature is raised from ambient to that of formation of green brick. Thus it is practically impossible to manufacture such shapes by the re-press method. This problem does not occur in manufacturing such shapes as cast brick. But cast bricks cost more to make due to the extra set-up time and manufacturing steps involved.

There is a need for a coke oven regenerator checker brick which provides sufficient surface area for high efficiency heat transfer while at the same time providing enough mass for heat retention, sufficiently large apertures and face configuration to prevent clogging from particulate matter, and which can be manufactured by the extrusion and re-press process.

SUMMARY OF THE INVENTION

The present invention is directed to improvements in coke oven regenerator checker brick used in coke oven regenerators to transfer exhaust gas heat to fuel gas and/or air, thus preheating that fuel gas and/or air. A checker brick of conventional overall size is made from conventional refractory material. All of the useful surface areas of the checker brick which are exposed, in use, to the flow of gases, are corrugated with a curved-wave configuration. The checker brick contains multiple slots, the surfaces of which are likewise corrugated, forming passageways for the flow of gases. The peripheral sides are corrugated in a like manner to enable the formation of gas flow passages as the checker brick are butted against one another in the conventional manner of laying up checker brickwork within a coke oven regenerator. The cross-sectional area and volume of refractory material in the checker brick are equivalent to conventional slotted, but uncorrugated, checker brick, and the aperture size of the slots, likewise, is equivalent to that of conventional brick both in cross-sectional area and general linear dimension. The surface area, exposed to the flow of gases, however, is approximately 50 percent greater than that of conventional slotted, but uncorrugated, checker brick. The smooth and relatively open curved-wave configuration of the corrugation minimizes the possibility of clogging found in other face configurations while enhancing the ease of manufacture of the checker brick.

Accordingly, one of the principal features of the present invention is to provide facility of manufacture with sufficient cross-sectional dimension of refractory material, combined with smooth and relatively open curved wave corrugations, while enhancing heat transfer by increasing the surface area of the checker brick exposed to gas flow.

Another feature of the present invention is to provide a checker brick which may be used interchangeably in regenerators of coke oven batteries designed for either rich gas heating (coke oven gas) or lean gas heating (blast furnace gas).

Another feature of the present invention is to provide a high efficiency checker brick which does not inhibit gas flow characteristics through a coke oven regenerator; such is accomplished by retention of the general aperture dimension and open cross-sectional area.

Another feature of the present invention is to provide a high efficiency checker brick which minimizes the possibility of clogging by particulate matter found in waste gases, or in blast furnace gas when used as a fuel.

Another feature of the present invention is to provide a high efficiency checker brick of a conventional overall size, minimizing the need for redesigning coke oven regenerators to enable use of the brick.

These and other features of the present invention will be more completely disclosed and described in the following specifications, the accompanying drawings and the appended claims.

DETAILED DESCRIPTION

Figure 1:
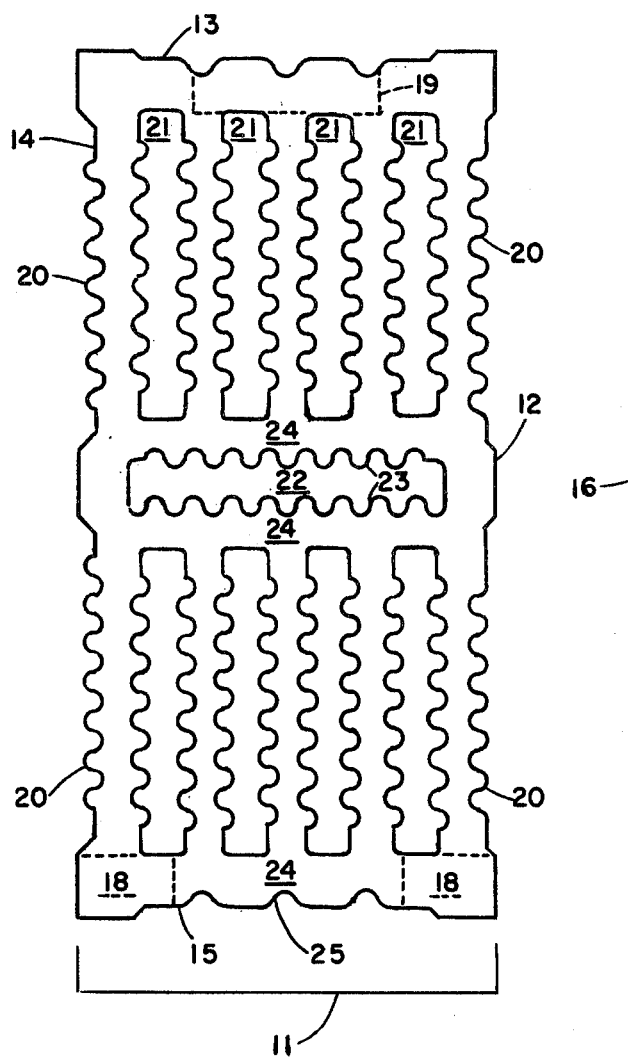
FIG. 1 is a top view of a checker brick.
Figure 2:
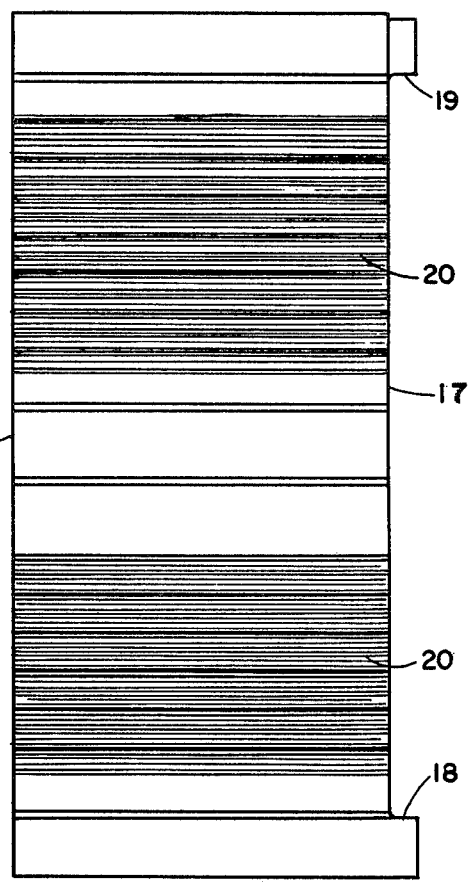
FIG. 2 is a side view of a checker brick.
Figure 3:
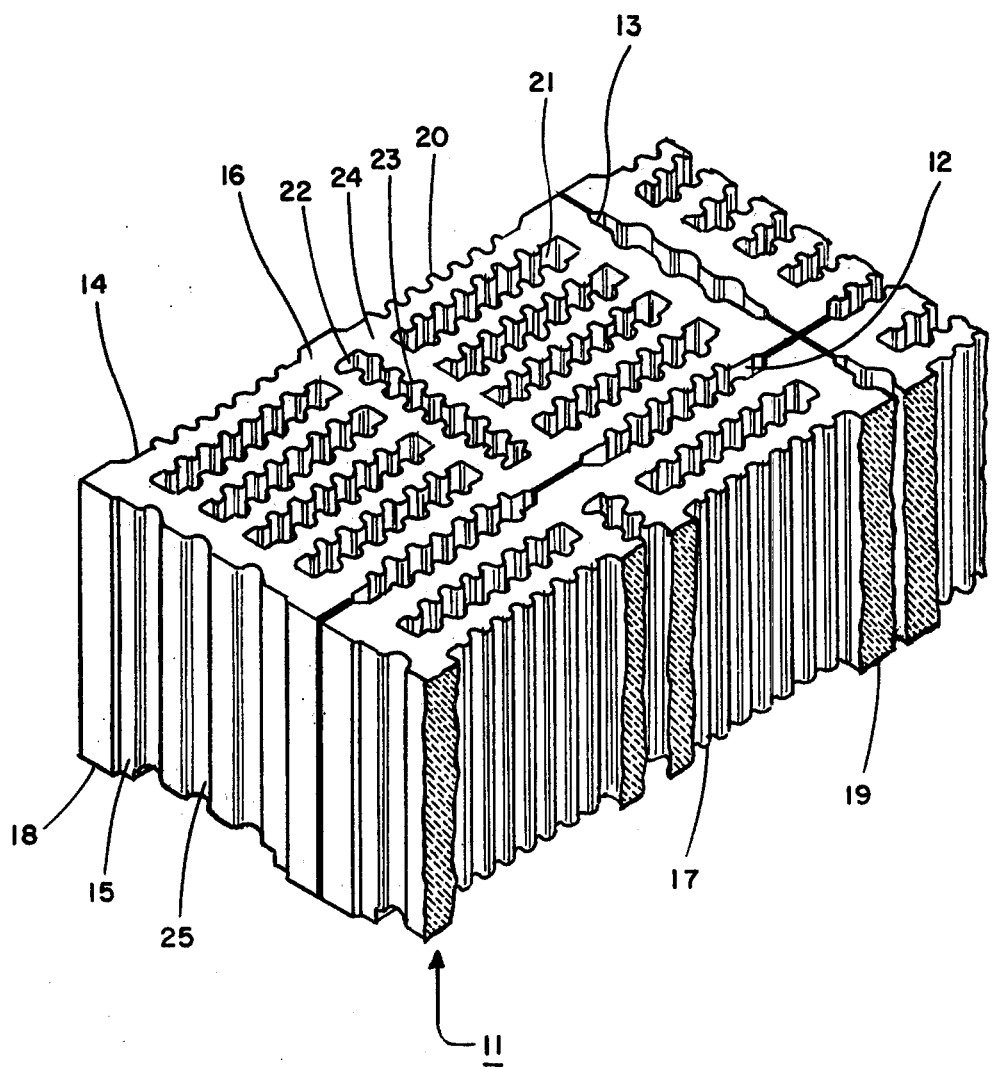
FIG. 3 is an isometric projection view of a checker brick as laid up, with other like checker brick, in a coke oven regenerator.

Referring to the drawings, a coke oven regenerator checker brick of conventional dimensions and overall cubicle shape, generally designated by the numeral 11, is illustrated. The checker brick 11 has four faces, the right face 12, the rear face 13, the left face 14, and the front face 15, along with a top 16 and a bottom 17. The bottom 17 includes a set of front risers 18 and a rear riser 19. The front risers 18 are positioned adjacent to the corners made by the front face 15 with the right face 12 and the left face 14. The rear riser 19 is positioned centrally, adjacent to the center of the rear face 13. The risers 18 and 19 enable separation of the checker brick 11 from the next lower level of checker brick in the regenerator. Three risers, 18 and 19, are preferred to insure that the checker brick will not rock when it is positioned in place in the regenerator. This separation of levels of checker brick is desirable to provide equalization of gas flow pressure within the regenerator. Faces 12 and 14 of the checker brick 11 are formed of two sets each of a corrugation configuration 20, recessed from the planes of the faces, as shown in FIG. 1. The corrugation configuration 20 is formed of alternate convex and concave 180° arcs, formed in a wave-like pattern as illustrated in the drawings. The radius of each arc is one eighth of an inch, the minimum threshold level below which is found a significantly increased tendency for the corrugation to clog with exhaust gas particulate matter. The arc radius can be as large as three sixteenths of an inch. Any larger of an arc would protrude beyond the surface plane too far, increasing constriction and turbulence in the gas flow.

The checker brick 11 contains two sets of slotted apertures 21, each set nominally containing four slotted apertures, although this number may change depending on the overall dimension of a given checker brick. The reason for two sets of slotted aperture 21, as illustrated in FIG. 1, rather than four long slotted apertures in the checker brick, is due to the fact that overly long slotted apertures would hinder the manufacture of the checker brick by means of the re-press method, thereby necessitating a return to the much slower and more costly casting method. Each of the aperture walls 23 have an identical corrugation configuration 20 as is incorporated into the faces 12 and 14, but in opposite relief to the corrugation configuration 20 of the faces of walls 12 and 14, adjacent to the respective common refractory section 24. Thus, each refractory section 24 is uniform in cross-sectional dimension at any given point as illustrated in the drawings. The reason that the faces 12 and 14 have two sets of corrugation configuration 20, rather than a long lengthy section, is to produce, as nearly as is commercially practicable, a uniform cross-sectional dimension of the respective common refractory sections 24. Separating the two sets of slotted apertures 21 is a cross aperture 22 running, lengthwise, perpendicular to the linear direction of the two sets of slotted apertures 21. The cross aperture 22 also embodies an identical corrugation configuration 20 into its aperture walls 23. The cross aperture 22 serves to form a convenient separator between the two sets of slotted apertures 21 while producing additional means for gas flow. The overall combined length of the slotted apertures 21 and the cross aperture 22 is equivalent to the combined slot lengths found in a conventional checker brick. The specific dimensional difference is found in the length of the surface of the walls 23 which is approximately 50% greater in total than that found in conventional checker brick of the same overall size. The overall area of the walls 23 is, likewise, approximately 50% greater than the total slot wall area found in conventional checker brick. The rear face 13 and the front face 15 have a different corrugation shape 25 from the corrugation configuration 20 found on the other faces 12 and 14. This corrugation shape 25 is in the form of alternate straight sections and modified concave arcs, as illustrated in the drawings. The purpose of this particular corrugation shape 25 is to channel the gas flow, through the apertures formed by the abutment of the front face 15 of one checker brick with the rear face 13 of a second checker brick, away from the risers 18 and 19 thereby normalizing the turbulence created by the flow of gas past those risers 18 and 19. The arc radius of the corrugation shape 25 is larger than that found in the corrugation configuration 20. This is necessitated by a need to draw the gas flow toward the center of the aperture formed by the rear face 13 and the front face 15 when two checker brick are abutted together, thereby reducing the amount of gas passing the risers 18. The alternate straight sections, rather than convex arcs, are necessitated by a need to reduce turbulence producing restrictions in the apertures formed by the abutment of the rear and front faces 13 and 15 of the two adjoining checker brick 11. The rear riser 19 forms a continuation of the corrugation shape 25 so that when there is no abrupt change in the flow pattern of the gases as they pass the rear riser 19.

The checker brick 11 are laid up in a coke oven regenerator in horizontal layers. Starting along the side edge of the regenerator, a row of checker brick is placed, each with its front face 15 abutting the side of the regenerator, with the left face 14 of each checker brick 11 abutting the right face 12 of the next checker brick 11 in line. Thus, a duplication of the slotted apertures 21 is accomplished by such abutment. A second row of checker brick 11 is then placed in identical fashion to the first row, with successive rows following until the first layer of checker brick is in place. An additional three layers are laid up, duplicating the positioning and placement of the checker brick in the first layer. The fifth course of checker brick 11 is laid transversally to the first four courses to stabilize the lay-up and thereby eliminate the need for other special and less efficient retaining brick heretofore required for stabilization. The arrangement of the slotted apertures 21 in the individual checker brick 11 provides for the least amount of obstruction to free flow of heated gases through the fifth transverse course of checker brick 11, thus minimizing undesirable pressure differentials within the coke oven regenerator.

In operation the waste gases are directed downwardly through the apertures 21 and 22 in the checker brick 11, heating the brick through the surface walls. The smooth faced wave-like corrugation configuration 20 eliminates sharp projections which tend to create turbulence in gas flow. The radii of the corrugation configuration 20 provide no area to entrap particulate matter found in the waste gas. The refractory section 24, being of the same cross-sectional dimension of conventional checker brick, retains the full ability to retain the heat carried through the regenerator by the waste gas; however, due to the approximately 50% increase in the area of the aperture walls 23, the heat is transferred from the waste gas to the checker brick 11 at a significantly faster rate. The checker brick 11 can be elevated, in temperature to a degree equivalent to that found in a conventional checker brick, in a shorter period of time, thus allowing a rechannelling of the exhaust gases in a shorter period of time; or, in the same period of time, the checker brick 11 can be heated to a higher temperature than obtained in a conventional checker brick, thus providing a greater potential heat exchange resulting in greater thermal efficiency. Therefore, since more heat is absorbed from the waste gases, those waste gases will leave the bottom of the regenerator at a lower temperature.

At the end of the heating period, the hot waste gas is rechannelled to the top of the companion regenerator and the cooler fuel gas mixture (or air) is introduced into the bottom of the regenerator chamber, directed upward through all the apertures. The heat retained by the checker brick 11 is transferred to the fuel gas (or air), elevating its temperature. Due to the increased capacity for heat transfer, a given volume of fuel gas (or air) can be heated to the required degree in a shorter period of time. Therefore, the flow rate of fuel gas through the regenerator can be increased providing an increased volume of preheated gas available for combustion per unit of time. The end result is that either the size of the regenerator can be decreased or the size and heat of the combustion chambers can be increased to produce a larger volume of coke from a larger oven, or a faster coking cycle in a conventional sized oven.

Another alternative is also available. Due to the ability of the checker brick 11 to transfer heat at a faster rate, rechannelling from waste gas to fuel gas, and back again to waste gas, can be done in a reduced time interval cycle. Thus, the average temperature within the regenerator can be increased by raising the lower threshold temperature at which the cycle must be switched from fuel gas to exhaust gas to maintain adequate combustion. The result is that less fuel gas per unit of time can be used, producing economy in the amount of fuel consumed, per unit of time, to maintain coal coking temperatures.

According to the patent statutes, the principles, the preferred construction, and the best mode of operation of the current invention have been explained, illustrated and described. However, it is to be understood that within the scope of the appended claims the invention may be practiced otherwise than as specifically illustrated and described.

What is claimed is:

1. A high efficiency coke oven regenerator checker brick, composed of refractory material, comprising:
    a. a vertical front side wall, the external face of which is formed of an alternate vertical concave radii, the radius of which is greater than ⅛ inch, and flat surface configuration symetrically positioned about the center of said wall;
    b. a vertical right side wall, projecting rearward from the right edge of said front side wall at a 90° angle, the external face of which is formed of a set of alternate vertical concave and convex radii configurations, the radius of which is not less than ⅛ inch, centrally divided by a vertical flat separator surface, with the internal face formed by the opposite relief of the external face;
    c. a vertical rear side wall, projecting to the left from the rear edge of said right wall at a 90° angle and running parallel to said front side wall, the external face of which is identical to that of said front side wall;
    d. a vertical left side wall forming a connection between the left edges of said rear side wall and said front side wall, projecting from each at a 90° angle, the external and internal faces of said left side wall being identical to those of said right side wall;
    e. a horizontal top surface abutting the top edges of said side walls and perpendicular to said side walls;

f. a horizontal bottom surface abutting the bottom edges of said side walls and perpendicular to said side walls;

g. a pair of vertical parallel cross walls connecting said right side wall with said left side wall about the mid points of said side walls, running perpendicular to said left side wall and said right side wall, creating a cross slot between said cross walls which bisects the center of said right side wall and said left side wall, the faces of said cross walls, exposed within said cross slot, being, in respective opposite relief, formed of alternate vertical concave and convex radii configurations, identical to said radii configuration of said right side wall;

h. a plurality of vertical front separator walls running parallel to and between said right side wall and said left side wall, connecting said front side wall to the foremost of said cross walls, said separator walls forming, with themselves and with the internal faces of said right side wall and said left side wall, slots, identical in size and configuration to said slot formed by said faces of said cross walls;

i. a plurality of vertical rear separator walls running parallel to and between said right side wall and said left side wall, connecting said rear side wall to the rearmost of said cross walls, said separator walls forming, with themselves and with the internal faces of said right side wall and said left side wall, slots, identical in size and configuration to said slot formed by said faces of said cross walls;

j. means, fixed to said checker brick, for elevating said checker brick above an object upon which said checker brick is placed, allowing a horizontal open space between said checker brick and said object upon which said checker brick is placed.

2. A high efficiency coke oven regenerator checker brick as recited in claim 1, wherein the alternate vertical concave and convex radii configurations which form said face of said right side wall, and all other said faces identical in configuration to said right side wall, have a radius dimension ranging from ⅛ inch to 3/16 inch inclusive.

3. A high efficiency coke oven regenerator checker brick as recited in claim 1, wherein said external faces of said right side wall and said left side wall are vertically bordered by vertical flat border surfaces adjacent to the front and rear vertical edges of said right side wall and said left side wall.

4. A high efficiency coke oven regenerator checker brick as recited in claim 1, wherein said concave radii of said face of said front side wall, and all other side faces identical in configuration to said front side wall, have a radius dimension ranging from ¼ inch to ⅜ inch inclusive.

5. A high efficiency coke oven regenerator checker brick as recited in claim 1, wherein said external faces of said front side wall and said rear side wall are vertically bordered by horizontally projecting vertical flat surfaces adjacent to the right and left vertical edges of said external faces of said front side wall and said rear side wall.

6. A high efficiency coke oven regenerator checker brick as recited in claim 1 in which said means for elevating said checker comprises:

a. a set of front risers, positioned on said bottom surface of said checker brick adjacent to the corners formed by the connection of said front side wall with said right side wall and said left side wall, projecting vertically downward from said bottom surface;

b. a rear riser, centrally positioned on the bottom surface of said checker brick adjacent to the bottom edge of said rear side wall, projecting vertically downward from said bottom surface, and forming a continuation of said external face of said rear side wall.

7. A high efficiency coke oven regenerator checker brick as recited in claim 3, wherein said vertical separator surface and said vertical border surfaces project outward equally from the plane of said alternate vertical concave and convex radii configuration.

8. A high efficiency coke oven regenerator checker brick, composed of refractory material, comprising:

a. a vertical front side wall, the external face of which is formed of an alternate vertical flat surface and concave radii configuration, said concave radii having a radius dimension ranging from ¼ inch to ⅜ inch inclusive, vertically bordered by horizontally projecting vertical flat surfaces adjacent to the right and left vertical edges of said external face;

b. a vertical right side wall, projecting rearward from the right edge of said front side wall at a 90° angle, the external face of which is formed of a set of alternate vertical concave and convex radii configurations, the radius dimension of said radii ranging from ⅛ inch to 3/16 inch inclusive, centrally divided by a vertical flat separator surface which projects outward from the plane of said alternate vertical concave and convex radii configuration, and vertically bordered by vertical flat border surfaces, adjacent to the front and rear vertical edges of said right side wall, which project outward from the plane of said alternate vertical concave and convex radii configuration at a distance equal to said vertical flat separator surface, the internal face of said right side wall formed by the opposite relief of said concave and convex radii configuration;

c. a vertical rear side wall, projecting to the left from the rear vertical edge of said right side wall at a 90° angle and running parallel to said front side wall, the external face of which is identical to that of said front side wall;

d. a vertical left side wall forming a connection between the left vertical edges of said rear side wall and said front side wall, projecting from each at a 90° angle, the external face of which has flat border surfaces and an external flat separator surface identical to that of said right side wall, the balance of the external face having an alternate concave and convex radii configuration the same configuration as, but in opposite relief to, said right side wall, the internal face being the same configuration as, but in opposite relief to, said right side wall;

e. a horizontal top surface abutting the top edges of said side walls and perpendicular to said side walls;

f. a horizontal bottom surface abutting the bottom edges of said side walls and perpendicular to said side walls;

g. a pair of vertical parallel cross walls connecting said right side wall with said left side wall, running perpendicular to said left side wall and said right side wall about the mid points of said side walls, opposed to said vertical separator surfaces of said side walls, creating a cross slot between said cross walls which bisects the center of said right side wall and said left side wall, the faces of said cross walls, exposed within said cross slot, being, in respective opposite relief, formed of alternate vertical concave and convex radii configurations identical to said concave and convex radii configuration of said right side wall and said left side wall;

h. a plurality of vertical front separator walls, running parallel to and between said right side wall and said left side wall, connecting said front side wall to the foremost of said cross walls, said separator walls forming, with themselves and with said internal faces of said right side wall and said left side wall, slots, identical in size and configuration to said slot formed by said faces of said cross walls;

i. a plurality of vertical rear separator walls, running parallel to and between said right side wall and said left side wall, connecting said rear side wall to the rearmost of said cross walls, said separator walls forming, with themselves and with the internal faces of said right side wall and said left side wall, slots, identical in size and configurations to said slot formed by said faces of said cross walls;

j. a set of front risers, positioned on said bottom surface of said checker brick adjacent to the corners formed by the connections of the bottom edges of said front side wall with said right side wall and said left side wall, projecting vertically downward from said bottom surface;

k. a rear riser, centrally positioned on said bottom surface of said checker brick adjacent to the bottom edge of said rear side wall, projecting vertically downward from said bottom surface, and forming a continuation of said external face of said rear side wall.

* * * * *